US008859092B2

(12) United States Patent
Uchida

(10) Patent No.: US 8,859,092 B2
(45) Date of Patent: Oct. 14, 2014

(54) ELECTROPHOTOGRAPHIC BELT AND ELECTROPHOTOGRAPHIC APPARATUS

(75) Inventor: Kouichi Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/395,877

(22) PCT Filed: Sep. 7, 2010

(86) PCT No.: PCT/JP2010/065686
§ 371 (c)(1),
(2), (4) Date: Mar. 13, 2012

(87) PCT Pub. No.: WO2011/034013
PCT Pub. Date: Mar. 24, 2011

(65) Prior Publication Data

US 2012/0183330 A1 Jul. 19, 2012

(30) Foreign Application Priority Data

Sep. 17, 2009 (JP) ................................. 2009-215566
Jul. 12, 2010 (JP) ................................. 2010-158132

(51) Int. Cl.
*B32B 5/16* (2006.01)
*G03G 15/00* (2006.01)

(52) U.S. Cl.
CPC ................................... *G03G 15/754* (2013.01)
USPC ........................... 428/327; 428/323; 399/162

(58) Field of Classification Search
None
See application file for complete search history.

(56) References Cited

U.S. PATENT DOCUMENTS

| | | | | |
|---|---|---|---|---|
| 4,690,539 | A * | 9/1987 | Radulski et al. | 399/237 |
| 2009/0208258 | A1 * | 8/2009 | Aoto | 399/308 |

FOREIGN PATENT DOCUMENTS

| | | | |
|---|---|---|---|
| CN | 1344978 | A | 4/2002 |
| JP | 2005-164673 | A | 6/2005 |
| JP | 2006-195431 | A | 7/2006 |
| JP | 2008-185945 | A | 8/2008 |
| JP | 2008-191225 | A | 8/2008 |
| JP | 2009-223282 | A | 10/2009 |

* cited by examiner

*Primary Examiner* — Sheeba Ahmed
(74) *Attorney, Agent, or Firm* — Canon U.S.A., Inc., IP Division

(57) ABSTRACT

An electrophotographic belt includes a thermoplastic resin composition obtained by melt-kneading a thermoplastic polyester resin, at least one selected from polyether ester amide and polyether amide, and particles having a certain core-shell structure.

5 Claims, 4 Drawing Sheets

ELECTROPHOTOGRAPHIC BELT AND ELECTROPHOTOGRAPHIC APPARATUS

TECHNICAL FIELD

The present invention relates to an electrophotographic belt and an electrophotographic apparatus.

BACKGROUND ART

PTL 1 discloses an intermediate transfer body constituted by a seamless belt composed of polyester and polyether ester amide.

CITATION LIST

Patent Literature

PTL 1 Japanese Patent Laid-Open No. 2006-195431

SUMMARY OF INVENTION

However, according to the study conducted by the inventor of the present invention, the intermediate transfer body disclosed in PTL 1 sometimes had poor durability. Specifically, the surface of the intermediate transfer body was sometimes irregularly detached when used in an electrophotographic apparatus. When an electrophotographic image was formed using an intermediate transfer body whose surface had been irregularly detached, image defects were seen in a spotted pattern on the electrophotographic image at the positions corresponding to the detached portions. This may be because there is a difference in adhesive force of toner between the detached portions and the undetached portions.

Accordingly, the present invention provides an electrophotographic belt in which the irregular detachment of the surface is suppressed even after long-term usage and the surface state is not easily changed from an initial surface state. The present invention also provides an electrophotographic apparatus that can stably form a high-quality electrophotographic image.

An electrophotographic belt according to the present invention is an electrophotographic belt comprising a thermoplastic resin composition obtained by melt-kneading a thermoplastic polyester resin, at least one selected from polyether ester amide and polyether amide, and a particle having a core-shell structure, wherein the particle having a core-shell structure is a particle consisting of a core comprising a silicone resin, and a shell comprising an acrylic resin.

An electrophotographic apparatus according to the present invention is an electrophotographic apparatus comprising the above-mentioned electrophotographic belt as an intermediate transfer belt.

According to the present invention, an electrophotographic belt can be obtained in which the irregular detachment of the surface is suppressed even after long-term usage and the surface state is not easily changed from an initial surface state. According to the present invention, an electrophotographic apparatus that can stably form a high-quality electrophotographic image can be obtained.

DESCRIPTION OF EMBODIMENT

[Electrophotographic Belt]

Figure 1:
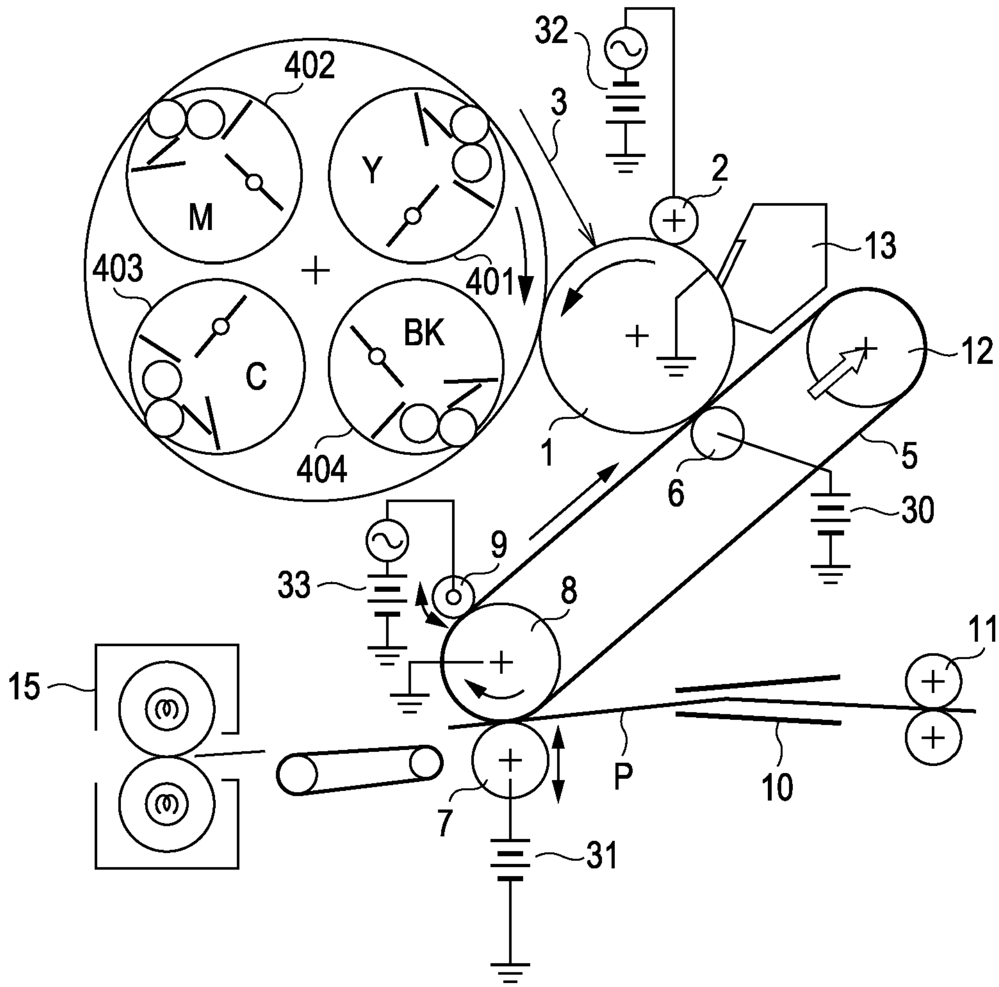
FIG. 1 is a sectional view of a full-color image forming apparatus that uses an electrophotographic process.

An electrophotographic belt according to the present invention includes a thermoplastic resin composition obtained by melt-kneading the materials i) to iii) below:

i) a thermoplastic polyester resin;

ii) at least one selected from polyether ester amide and polyether amide; and iii) particles (hereinafter may be referred to as "core-shell particles") having a core-shell structure including a core composed of a silicone resin and a shell composed of an acrylic resin. Hereinafter, a thermoplastic polyester resin may be referred to as "PE", polyether ester amide may be referred to as "PEEA", and polyether amide may be referred to as "PEA".

The inventor of the present invention considers, as below, the reason why the surface of the intermediate transfer body according to PTL 1 is irregularly detached. That is, PE and PEEA in the intermediate transfer body are not completely compatible with each other, and thus a PEEA phase and a PE phase are present in a mixed manner from a microscopic view point. Therefore, when the surface of the intermediate transfer body is rubbed against a cleaning blade, paper, or the like, a relatively soft PEEA phase is detached from a PE phase. On the basis of such a consideration, the inventor has examined a mechanism with which the surface detachment of the electrophotographic belt according to the present invention is effectively suppressed even after long-term usage. As a result, in the case where the core-shell particles are present at an interface between the PE phase and the PEEA phase of the electrophotographic belt, it has been confirmed that the detachment of the PEEA phase from the PE phase is not easily caused. Based on the fact, the inventor has considered as follows. An acrylic resin constituting the shell of the core-shell particles has an ester bond that displays a chemical affinity on both the PE phase and the PEEA phase. Therefore, the PE phase and the PEEA phase are bonded to each other with the shell of the core-shell particles therebetween, the core-shell particles being present at the interface between the phases. Thus, the wear or detachment of the PEEA phase caused more easily than that of the PE phase can be suppressed.

The inventor has also found that, when an electrophotographic belt according to the present invention is used as an intermediate transfer belt, surprisingly, the transfer efficiency of toner images at a secondary transfer is high. Herein, when a toner image primarily transferred from a photoconductor is secondarily transferred onto paper and the sum of the residual toner density on an intermediate transfer belt after the secondary transfer and the transferred toner density on the paper is assumed to be 100, the transfer efficiency is defined as the toner density on the paper.

The inventor has considered, as below, the reason why the electrophotographic belt according to the present invention produces such an advantage. When a thermoplastic resin composition is prepared by melt kneading, a resin composition containing PE, PEEA, and core-shell particles is heated at a temperature higher than or equal to Tm (melting point) of PE and Tm of PEEA. In this case, since Tg of an acrylic resin contained in the shell of the core-shell particles is lower than Tm of PE and PEEA, part of the shell of the core-shell particles is melted during melt kneading and the core is partly exposed. Therefore, satisfactory toner releasing properties are imparted to the surface of the belt by the action of a silicone resin contained in the core particles, which improves the transfer efficiency. Even if PEA is used instead of PEEA, the same results as those of PEEA are obtained.

[Thermoplastic Resin Composition]

The thermoplastic resin composition according to the present invention is obtained by melt-kneading PE, at least one of PEEA and PEA, and particles having a specific core-shell structure. The melt kneading means that resins to be contained in the thermoplastic resin composition are heated and kneaded in a molten state. In this method, kneading can be performed at a temperature higher than or equal to the melting point of a resin having the highest melting point of the resins to be contained in the thermoplastic resin composition so that the resin having the highest melting point can be thoroughly kneaded. The kneading method is not particularly limited. For example, a uniaxial extruder, a biaxial kneading extruder, a Banbury mixer, a roller, Brabender, Plastograph, or a kneader can be used.

[PE]

PE can be obtained by polycondensation of dicarboxylic acid with diol, polycondensation of oxycarboxylic acid or lactone, or polycondensation of the multiple components thereof. Multifunctional monomers may be used together. PE may be homopolyester or copolyester.

Examples of the dicarboxylic acid include:

aromatic dicarboxylic acids (e.g., terephthalic acid, isophthalic acid, phthalic acid, naphthalene dicarboxylic acid (e.g., 2,6-naphthalene dicarboxylic acid), diphenyl dicarboxylic acid, diphenyl ether dicarboxylic acid, diphenylmethane dicarboxylic acid, and diphenylethane dicarboxylic acid);

cycloalkane dicarboxylic acids having 4 to 10 carbon atoms (e.g., cyclohexane dicarboxylic acid); and aliphatic dicarboxylic acids having 4 to 12 carbon atoms (e.g., succinic acid, adipic acid, azelaic acid, and sebacic acid).

Examples of the diol include:

aliphatic diols (e.g., alkylenediols having 2 to 10 carbon atoms such as ethylene glycol, propylene glycol, 1,3-butanediol, 1,4-butanediol, neopentyl glycol, and hexanediol);

alicyclic diols (e.g., alicyclic diols having 4 to 12 carbon atoms such as cyclohexanediol and cyclohexanedimethanol);

aromatic diols (e.g., aromatic diols having 6 to 20 carbon atoms such as hydrochinon, resorcin, dihydroxybiphenyl, naphthalenediol, dihydroxy diphenyl ether, 2,2-bis(4-hydroxyphenyl)propane(bisphenol A)); and alkylene oxide adducts of the above-described aromatic diols (adducts obtained by adding an alkylene oxide having 2 to 4 carbon atoms to bisphenol A) and polyoxyalkylene glycols (e.g., diethylene glycol, polyoxyethylene glycol, polyoxypropylene glycol, and polytetramethylene ether glycol).

These diols may be derivatives that can perform esterification (e.g., an alkyl group, an alkoxy group, and a halogen substitution product). These diols can be used alone or in combination. Among these diols, alkylenediols having 2 to 4 carbon atoms and alicyclic diols can be favorably used in terms of the crystallinity of PE obtained, heat resistance, and the like.

The oxycarboxylic acid is exemplified as follows. The oxycarboxylic acids listed below can be used alone or in combination.

oxycarboxylic acids such as oxybenzoic acid, oxynaphthoic acid, diphenylene oxycarboxylic acid, and 2-hydroxypropanoic acid, and the derivatives of the oxycarboxylic acids The lactone is exemplified as follows.

propiolactone, butyrolactone, valerolactone, and caprolactone (e.g., ϵ-caprolactone)

The multifunctional monomers are exemplified as follows. By using such multifunctional monomers together, polyesters having a branched structure or a cross-linked structure can be obtained.

polyhydric carboxylic acids (e.g., trimellitic acid, trimesic acid, and pyromellitic acid) and polyhydric alcohols (glycerin, trimethylolpropane, trimethylolethane, and pentaerythritol)

As the PE according to the present invention, polyalkylene terephthalate, polyalkylene naphthalate, or a copolymer of polyalkylene terephthalate and polyalkylene isophthalate, all of which have high crystallinity and good heat resistance, can be suitably used. The copolymer in this case may be a block copolymer or a random copolymer. The number of carbon atoms of alkylene groups in polyalkylene terephthalate, polyalkylene isophthalate, and polyalkylene naphthalate is desirably 2 to 16 in terms of high crystallinity and good heat resistance. Specifically, polyethylene terephthalate, a copolymer of polyethylene terephthalate and polyethylene isophthalate, and polyethylene naphthalate can be desirably used as the PE according to the present invention.

Polyethylene naphthalate is commercially available as TN-8050SC (product name, manufactured by Teijin Chemicals Ltd.) and TN-8065S (product name, manufactured by Teijin Chemicals Ltd.). Polyethylene terephthalate is commercially available as TR-8550 (product name, manufactured by Teijin Chemicals Ltd.). The copolymer of polyethylene terephthalate and polyethylene isophthalate is commercially available as PIFG30 (product name, manufactured by Bell Polyester Products, Inc.).

The intrinsic viscosity of PE is preferably 1.4 dl/g or less and more preferably 0.3 dl/g or more and 1.2 dl/g or less. PE with such an intrinsic viscosity has good flowability during melt kneading. The content of PE in the thermoplastic resin composition is preferably 50% or more, more preferably 60% or more, and particularly preferably 70% or more by mass relative to the total mass of the thermoplastic resin composition. By setting the content of PE to 50% or more by mass relative to the total mass of the thermoplastic resin composition, the mechanical strength of the thermoplastic resin composition can be further improved. The intrinsic viscosity of the thermoplastic polyester resin is measured at 25° C. using a solution obtained by dissolving a thermoplastic polyester resin in o-chlorophenol, the solution having a concentration of 0.5% by mass.

[PEEA and PEA]

PEEA

An example of PEEA is a compound mainly composed of a copolymer constituted by polyamide block units such as nylon 6, nylon 66, nylon 11, and nylon 12 and polyether ester units. For example, the copolymer is derived from lactam (e.g., caprolactam and lauryllactam) or aminocarboxylate, polyethylene glycol, and dicarboxylic acid. Examples of the dicarboxylic acid include terephthalic acid, isophthalic acid, adipic acid, azelaic acid, sebacic acid, undecanedioic acid, and dodecanedioic acid. PEEA can be produced by a publicly known polymerization method such as melt polymerization. PEEA is not limited to the above-described substances, and may be a blend or alloy of two or more substances. PEEA is commercially available as Irgastat P20 (product name, manufactured by Ciba Specialty Chemicals), TPAE H151 (product name, manufactured by FUJI KASEI KOGYO Co., Ltd.), and PELESTAT NC6321 (product name, manufactured by Sanyo Chemical Industries, Ltd.).

PEA

PEA is a copolymer constituted by polyamide block units (e.g., nylon 6, nylon 66, nylon 11, and nylon 12), polyether diamine units, and dicarboxylic acid units. Specifically, the copolymer is synthesized from lactam (e.g., caprolactam and lauryllactam) or aminocarboxylate, polytetramethylenediamine, and dicarboxylic acid. The above-described dicarboxylic acids can be used. PEA can be produced by a publicly known polymerization method such as melt polymerization. PEA is not limited to the above-described substances, and may be a blend of two or more of the polyether amides or an alloy thereof. PEA is commercially available as Pebax 5533 (product name, manufactured by ARKEMA).

Blending Amount

The total amount of PEEA and PEA is preferably 3% or more and 30% or less by mass and more preferably 5% or more and 20% or less by mass relative to the total mass of the thermoplastic resin composition. PEEA and PEA serve as a conductive agent. Thus, when the amount is 3% or more by mass, the electrical resistance of the thermoplastic resin composition, that is, the electrical resistance of an electrophotographic belt can be appropriately decreased. When the amount is 30% or less by mass, a decrease in viscosity caused by the decomposition of a resin can be suitably suppressed. As a result, the durability of a formed electrophotographic belt can be further improved.

[Particles Having a Core-Shell Structure]

Particles having a core-shell structure each include a core composed of a silicone resin and a shell composed of an acrylic resin. The silicone resin is obtained by highly polymerizing a compound having a siloxane bond (Si—O—Si bond). Examples of the silicone resin include polysiloxane obtained by highly polymerizing siloxane, polydimethylsiloxane obtained by highly polymerizing dimethylsiloxane, and compounds having three-dimensionally cross-linked siloxane skeletons. Examples of the acrylic resin include polyacrylic acid, polymethacrylic acid, polymethyl methacrylate, and polyacrylonitrile.

The amount of the particles having a core-shell structure is preferably 0.1% or more and 20% or less by mass and more preferably 1% or more by mass relative to the total mass of the thermoplastic resin composition. By setting the amount within the range, higher durability and transfer efficiency can be achieved. Furthermore, good blow moldability can be achieved.

The particles having a core-shell structure is commercially available as GENIOPERL P52 (product name, manufactured by WACKER ASAHIKASEI SILICONE Co., Ltd.). The particles include a core composed of a silicone resin and a shell composed of polymethyl methacrylate. The primary particle size of the particles having a core-shell structure is preferably 0.1 nanometers or more and 10 micrometers or less, more preferably 10 nanometers or more and 1 micrometers or less, and particularly preferably 50 nanometers or more and 500 nanometers or less. Primary particles are particles that constitute the powder produced and whose molecular bonds remain left. The average particle size of the particles can be defined as a primary particle size. The primary particle size can be measured by, for example, laser diffraction scattering.

[Additive]

Other components may be added to the thermoplastic resin composition as long as the advantages of the present invention are not impaired. Examples of the other components include ion conductive agents other than PEEA and PEA, conductive polymers, antioxidants, ultraviolet absorbers, organic pigments, inorganic pigments, pH adjusting agents, cross-linking agents, compatibilizers, release agents, coupling agents, lubricants, insulating fillers, and conductive fillers.

[Silicone Oil]

Among the additives described above, silicone oil is desirable because silicone oil can further improve the transfer efficiency of the electrophotographic belt according to the present invention. By adding silicone oil, toner releasing properties on the surface of the electrophotographic belt can be further improved. Straight silicone oil and modified silicone oil can be used as silicone oil. Examples of the modified silicone oil include polyether modified silicone oil and epoxy modified silicone oil.

In view of ease of melt kneading, the viscosity of silicone oil is preferably 5 centistokes or more and less than 3000 stokes and more preferably 100 centistokes or more and less than 1000 centistokes or less. The content of silicone oil is about 0.1% or more and 3% or less by mass relative to the total mass of the thermoplastic resin composition.

[Electrophotographic Belt]

The electrophotographic belt according to the present invention includes the thermoplastic resin composition described above. Specifically, an electrophotographic seamless belt can be obtained by pelletizing the thermoplastic resin composition and then molding the pellet using a publicly known molding method such as continuous melt extrusion, injection molding, stretch blow molding, or inflation molding. Among these methods, continuous melt extrusion and stretch blow molding are particularly desirable. The continuous melt extrusion includes a downwardly extruding internal cooling mandrel system that can precisely control the inner diameter of extruded tubes and a vacuum sizing system. The thickness of the electrophotographic belt is about 10 micrometers or more and 500 micrometers or less and preferably 30 micrometers or more and 150 micrometers or less.

The electrophotographic belt according to the present invention may be used by winding the belt around a drum or roller or by covering a drum or roller with the belt, in addition to using as a belt. To improve the surface appearance of the electrophotographic seamless belt according to the present invention and to improve toner releasing properties, a processing agent may be applied or surface treatment such as polishing may be performed. The electrophotographic belt according to the present invention can be specifically used for an intermediate transfer belt configured to support a toner image primarily transferred from an electrophotographic photoconductor, a conveying transfer belt, and a photoconductor belt. In particular, the electrophotographic belt can be suitably used as an intermediate transfer belt. When the electrophotographic seamless belt is used as an intermediate transfer belt, the volume resistivity is about $1\times10^{2}$ Ωcm or more and $1\times10^{14}$ Ωcm or less.

[Electrophotographic Apparatus]

An electrophotographic apparatus according to the present invention will be described. FIG. 1 is a sectional view of a full-color electrophotographic apparatus. A middle-resistance electrophotographic seamless belt is used as an electrophotographic belt 5 in FIG. 1. An electrophotographic photoconductor 1 is a rotary drum electrophotographic photoconductor (hereinafter referred to as a “photosensitive drum”) that is repeatedly used as a first image supporting body and rotates at a certain peripheral speed (processing speed) in a direction indicated by an arrow. The photosensitive drum 1 is uniformly charged by a primary charger 2 at a certain polarity and potential during the rotation thereof. Next, an electrostatic latent image corresponding to a first color component image (e.g., yellow color component image)

of an intended color image is formed when the photosensitive drum 1 is exposed to exposure light 3 emitted from an exposure unit. Examples of the exposure unit includes a color separation/imaging exposure optical system of color document images and a laser-beam scanning exposure system that outputs a laser beam modulated in accordance with a time-series electrical digital pixel signal of image information. The electrostatic latent image is then developed using yellow toner Y, which is a first color, by a first developing unit (yellow developing unit 401). At this moment, second to fourth developing units (magenta developing unit 402, cyan developing unit 403, and black developing unit 404) are not operated and thus do not act on the photosensitive drum 1. Consequently, the yellow (first color) toner image is not affected by the second to fourth developing units. The electrophotographic belt 5 rotates at the same peripheral speed as that of the photosensitive drum 1 in a direction indicated by an arrow. When the yellow toner image formed on the photosensitive drum 1 passes through a nip portion between the photosensitive drum 1 and the electrophotographic belt 5, the yellow toner image undergoes intermediate transfer (primary transfer) so as to be transferred onto the outer peripheral surface of the electrophotographic belt 5 through a transfer bias applied to the electrophotographic belt 5 from a primary transfer counter roller 6. After the yellow (first color) toner image is transferred onto the electrophotographic belt 5, the surface of the photosensitive drum 1 is cleaned by a cleaning unit 13. In the same manner, a magenta (second color) toner image, a cyan (third color) toner image, and a black (fourth color) toner image are sequentially transferred onto the electrophotographic belt (intermediate transfer belt) 5 so as to be overprinted. Thus, a composite color toner image corresponding to an intended color image is formed. A secondary transfer roller 7 is supported by a bearing so as to be in parallel with a driving roller 8 and disposed so that the roller 7 can be apart from the lower surface of the electrophotographic belt 5. The primary transfer bias for sequentially transferring the first to fourth color toner images in an overprinting manner from the photosensitive drum 1 onto the electrophotographic belt 5 has a polarity (+) opposite to that of the toner and is applied from a bias power source 30. The application voltage is, for example, +100 V or more and +2 kV or less.

In the primary transfer step of transferring the first to third toner images from the photosensitive drum 1 onto the electrophotographic belt 5, the secondary transfer roller 7 can be apart from the electrophotographic belt 5. The composite color toner image transferred onto the electrophotographic belt 5 is transferred onto a transfer material P, which is a second image supporting body, as follows. First, the transfer material P is supplied at a certain timing from paper feeding rollers 11 to a contact nip portion between the electrophotographic belt 5 and the secondary transfer roller 7 through a transfer material guide 10 while the secondary transfer roller 7 is brought into contact with the electrophotographic belt 5. A secondary transfer bias is then applied to the secondary transfer roller 7 from a power source 31. The composite color toner image is (secondarily) transferred onto the transfer material P, which is a second image supporting body, from the electrophotographic belt (intermediate transfer belt) 5 through the secondary transfer bias. The transfer material P onto which the toner image has been transferred is guided to a fixing unit 15, and is heated and fixed. After the image is transferred onto the transfer material P, an intermediate transfer belt cleaning roller 9 of a cleaning unit is brought into contact with the electrophotographic belt 5, and a bias with a polarity opposite to that of the photosensitive drum 1 is applied. Thus, a charge with a polarity opposite to that of the photosensitive drum 1 is provided to the toner left on the electrophotographic belt 5 without being transferred onto the transfer material P. Reference numeral 33 denotes a bias power source. The untransferred toner is electrostatically transferred onto the photosensitive drum 1 at/around a nip portion between the electrophotographic belt 5 and the photosensitive drum 1. As a result, the electrophotographic belt 5 is cleaned.

EXAMPLES

The present invention will now be specifically described based on Examples and Comparative Examples. Evaluation methods (1) to (6) of electrophotographic belts according to Examples and Comparative Examples will now be described. A transfer medium used for image forming in the evaluations was A4 paper that had an arithmetical mean roughness (Ra) of 4 and a ten-point mean roughness (Rzjis) of 15 and that was left in an environment of 23° C. and 45% RH for one day.

Measurement and Evaluation Methods of Characteristic Values

The measurement and evaluation methods of characteristic values of electrophotographic seamless belts produced in Examples and Comparative Examples are as follows.

(1) Volume Resistivity (ρv)

A digital ultra-high resistance/micro current meter (product name: R8340A manufactured by ADVANTEST Corporation) and a sample box for ultra-high resistance measurement (product name: TR42 manufactured by ADVANTEST Corporation) were used as a measurement device. The diameter of a main electrode was set to 25 mm, the inner diameter of a guard ring electrode was set to 41 mm, and the outer diameter was set to 49 mm (in conformity with ASTMD 257-78).

A sample for measuring the volume resistivity of the electrophotographic seamless belt was prepared as follows. First, an electrophotographic seamless belt was cut out so as to have a circular shape with a diameter of 56 mm. An electrode composed of a Pt—Pd deposited film was formed on the entire surface of one side of the cut-out circular piece. A main electrode having a diameter of 25 mm and composed of a Pt—Pd deposited film and a guard electrode having an inner diameter of 38 mm and an outer diameter of 50 mm were formed on the other side of the circular piece.

The Pt—Pd deposited film was formed by a sputtering apparatus (product name: Mild Sputter E1030 manufactured by Hitachi Ltd.). In the deposition, the current was 15 mA, the distance between a target (Pt—Pd) and a sample (the circular piece of the electrophotographic seamless belt) was 15 mm, and the deposition time was 2 minutes.

The measurement was performed in an environment of 23° C. and 52% RH. The sample for measurement was left in the above-described environment for 12 hours in advance. The measurement mode of volume resistivity was 10 seconds of discharge, 30 seconds of charge, and 30 seconds of measurement, and the application voltage was 100 V. Volume resistivity was measured ten times with this measurement mode, and the average value of the ten measured values was employed as a volume resistivity of the electrophotographic seamless belt.

(2) Uniformity of Electrical Resistance

Volume resistivity of an electrophotographic seamless belt having a width of 250 mm and a length of 450 mm was measured at nine points (three points×three points) and evaluated in accordance with the criteria below. The three measurement points in the length direction of the electrophotographic seamless belt were set at intervals of 150 mm, and the three measurement points in the width direction were a central portion and portions 60 mm from both ends.

A: (Maximum value of volume resistivity)/(minimum value of volume resistivity)<2

B: (Maximum value of volume resistivity)/(minimum value of volume resistivity)≥2

(3) Surface Peel Property at Initial Stage

Cuts with a depth of about 10 micrometers were made at an interval of 5 mm in both vertical and horizontal directions using a knife in a rectangular region (125 mm×20 mm) of the surface of the electrophotographic seamless belt. Subsequently, an adhesive tape (product name: No. 31B manufactured by NITTO DENKO Corporation) made of polyester was attached to the rectangular region with cuts by being pressed strongly with a finger. The adhesive tape had a length of 130 mm and a width of 22 mm. The adhesive tape was peeled off while lifted up at an angle of 45°. The number of the square cuts that were detached together with the adhesive tape among 100 square cuts made in the rectangular region was counted, and the evaluation was made in accordance with the criteria below.

A: 0 to 2

B: 3 to 5

C: 10 or more (4) Surface Peel Property after Durability Test

The electrophotographic seamless belt was installed in a drum cartridge of a full-color electrophotographic apparatus (product name: LBP-5200 manufactured by CANON KABUSHIKI KAISHA) as an intermediate transfer belt. A solid image was printed on 10000 transfer media. Subsequently, the electrophotographic seamless belt was taken out from the full-color electrophotographic apparatus and the toner was removed by blowing air on the surface. The test and evaluation were performed in the same manner as in (3).

(5) Transfer Efficiencies at Initial Stage and after Durability Test

The electrophotographic seamless belt was installed in a drum cartridge of a full-color electrophotographic apparatus (product name: LBP-5200 manufactured by CANON KABUSHIKI KAISHA) as an intermediate transfer belt. A cyan solid image was continuously formed on transfer media using the full-color electrophotographic apparatus.

When the sum of the density of toner secondarily transferred on a transfer medium and the density of toner left on an electrophotographic seamless belt after the secondary transfer is assumed to be 100%, the ratio of the density of toner on the transfer medium was defined as a transfer efficiency. As the ratio is increased, the secondary transfer efficiency becomes better. The transfer efficiency of an image formed on the 100th transfer medium was defined as a transfer efficiency at an initial stage, and the transfer efficiency of an image formed on the 10000th transfer medium was defined as a transfer efficiency after a durability test. When both the transfer efficiencies are high and the difference in transfer efficiency therebetween is small, the electrophotographic seamless belt has long-term stability in terms of secondary transfer performance.

(6) Evaluation of Quality of 10th Image

The electrophotographic seamless belt was installed in a drum cartridge of a full-color electrophotographic apparatus (product name: LBP-5200 manufactured by CANON KABUSHIKI KAISHA) as an intermediate transfer belt. A purple solid image was formed on a transfer medium using the full-color electrophotographic apparatus by superimposing cyan toner on magenta toner. The image formed on the 10th transfer medium was evaluated through visual inspection in accordance with the criteria below.

A: Density unevenness cannot be seen.

B: Density unevenness is slightly seen over the entire image.

C: Density unevenness is clearly seen over the entire image.

Materials of Thermoplastic Resin Compositions Used in Examples and Comparative Examples Tables 1 to 4 show the materials of thermoplastic resin compositions used in Examples and Comparative Examples. Tables 5 and 7 show the mixing ratio of the materials.

TABLE 1

| | |
|---|---|
| PE 1 | Polyethylene naphthalate<br>(product name: TN-8050SC manufactured by Teijin Chemicals Ltd.)<br>Tm: 260° C.<br>Intrinsic viscosity: 0.50 dl/g (25° C., 0.5% by mass o-chlorophenol solution) |
| PE 2 | Polyethylene terephthalate<br>(product name: TR-8550 manufactured by Teijin Chemicals Ltd.)<br>Tm: 260° C.<br>Intrinsic viscosity: 0.50 dl/g (25° C., 0.5% by mass o-chlorophenol solution) |

TABLE 2

| | |
|---|---|
| PEEA 1 | product name: Irgastat P20 manufactured by Ciba Specialty Chemicals<br>Tm: 180° C. |
| PEEA 2 | product name: TPAE H151 manufactured by FUJI KASEI KOGYO Co., Ltd.<br>Tm: 160° C. |
| PEA | product name: Pebax 5533 manufactured by ARKEMA<br>Tm: 170° C. |

TABLE 3

| | |
|---|---|
| Core-shell particles 1 | product name: GENIOPERL P52 manufactured by WACKER ASAHIKASEI SILICONE Co., Ltd.<br>Core: polydimethylsiloxane (silicone resin)<br>Shell: polymethyl methacrylate (acrylic resin)<br>Primary particle size: 160 nm |
| Core-shell particles 2 | product name: PARALOID EXL 2655 manufactured by Rohm and Haas Company<br>Core: butadiene rubber<br>Shell: polymethyl methacrylate (acrylic resin) |
| Core-shell particles 3 | product name: METABLEN W-300A manufactured by MITSUBISHI RAYON Co., Ltd.<br>Core: acrylic resin<br>Shell: graft polymer of vinyl monomers |

TABLE 4

| | |
|---|---|
| Additive 1 | Surfactant<br>(potassium perfluorobutanesulfonate manufacture by Mitsubishi Materials Corporation) |
| Additive 2 | Cross-linked polymethyl methacrylate resin particles<br>(product name: Techpolymer MBX-5 manufactured by SEKISUI PLASTICS Co., Ltd.)<br>particles mainly composed of polymethyl methacrylate |
| Additive 3 | Silicone resin<br>(product name: Tospearl 120 manufactured by Momentive Performance Materials Inc.)<br>particles mainly composed of polydimethylsiloxane |
| Additive 4 | Polyether modified silicone oil<br>(product name: 71 ADDITIVE manufactured by Dow Corning Toray Co., Ltd.) |
| Additive 5 | Epoxy modified silicone oil<br>(product name: SH 28 PAINT ADDITIVE manufactured by Dow Corning Toray Co., Ltd.) |

Example 1

A thermoplastic resin composition was prepared by performing melt kneading at a mixing ratio described in Table 5 using a biaxial extruder (product name: TEX30a manufactured by The Japan Steel Works, Ltd.). The melt-kneading temperature was adjusted to 260° C. or higher and 280° C. or lower, and the melt-kneading time was set to about 3 minutes.

Figure 2:
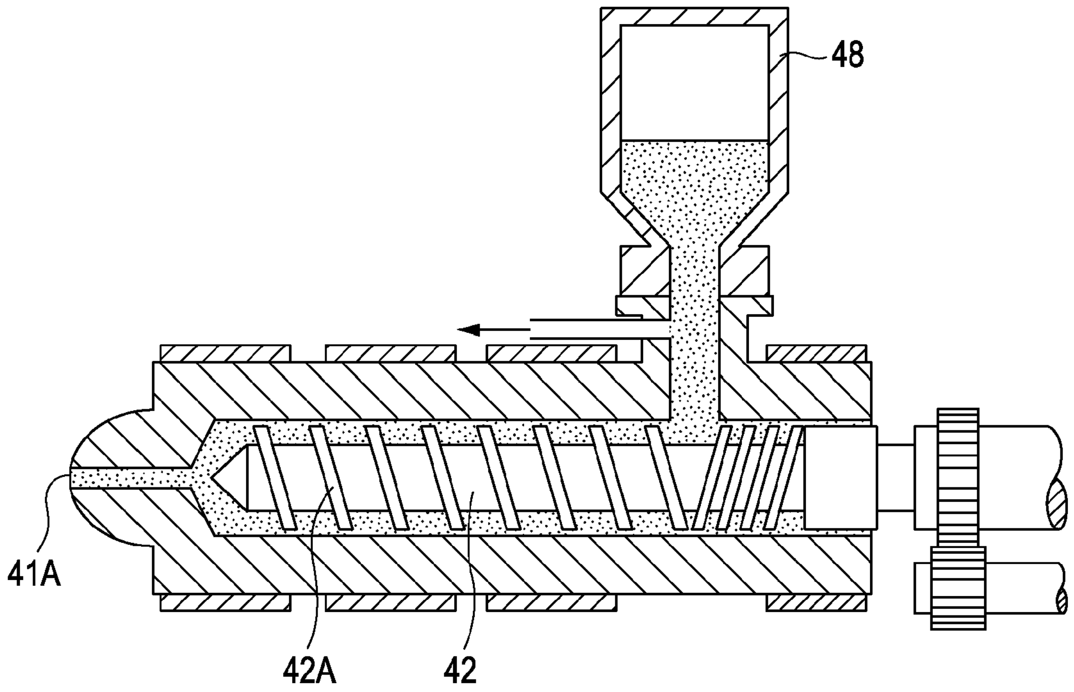
FIG. 2 is a schematic view showing an example of an injection molding machine.
Figure 3:
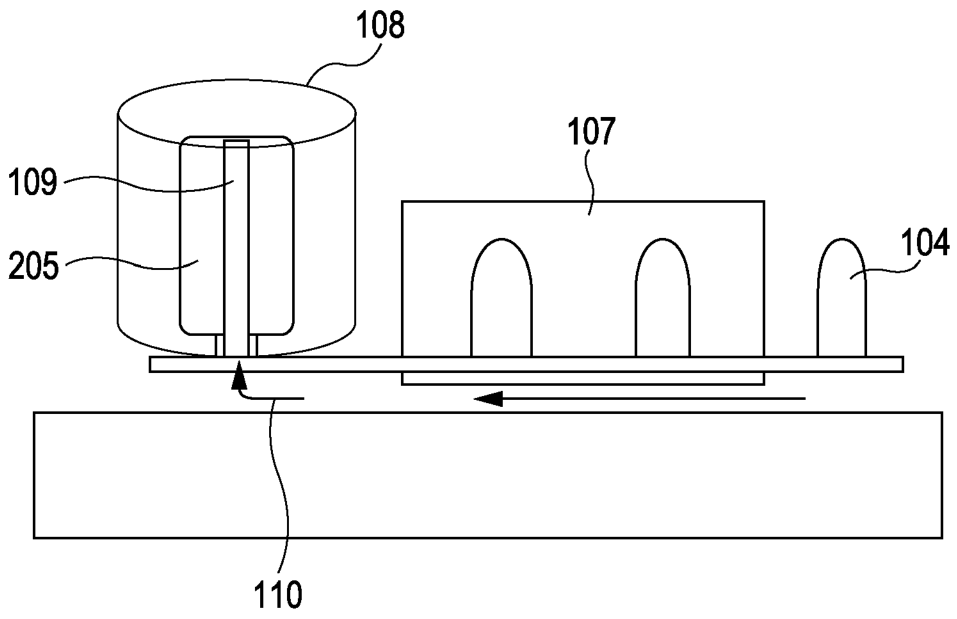
FIG. 3 is a schematic view showing an example of a stretch blow molding machine (first blow molding machine).
Figure 4:
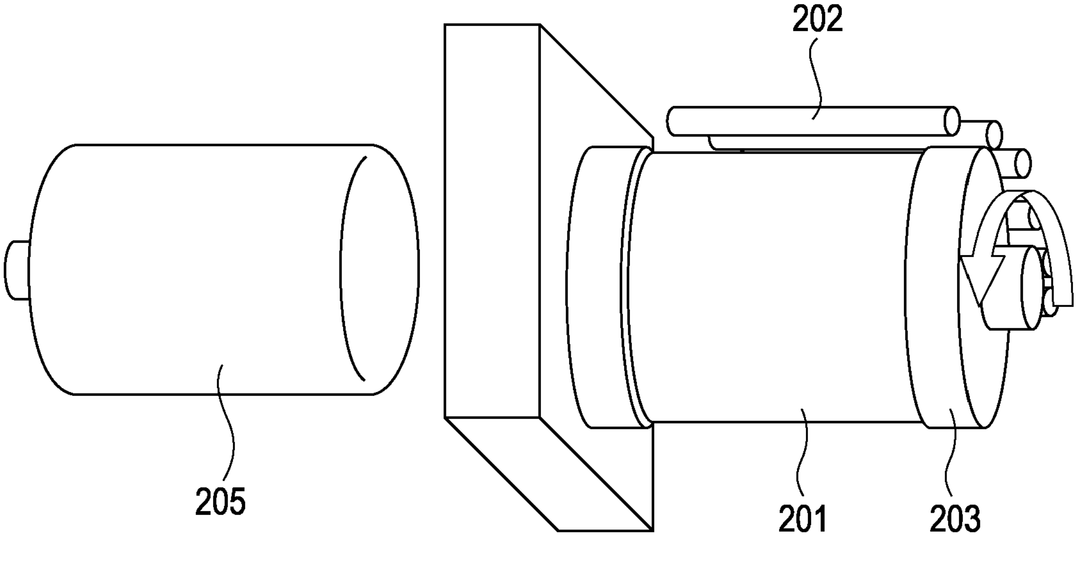
FIG. 4 is a schematic view showing an example of a second blow molding machine.

The resultant thermoplastic resin composition was pelletized and dried at 140° C. for 6 hours. The dried thermoplastic resin composition in a pellet form was inserted into a hopper 48 of an injection molding machine (product name: SE180D manufactured by Sumitomo Heavy Industries., Ltd.) having a structure shown in FIG. 2. The temperature of a cylinder was set to 295° C. The thermoplastic resin composition was melted in screws 42 and 42A and injection-molded into a mold through a nozzle 41A to produce a preform 104. Herein, the temperature of the injection mold was set to 30° C. After the preform 104 was inserted into a heating device 107 having a temperature of 500° C. to soften the preform 104, the preform 104 was heated at 500° C. Subsequently, the preform 104 was inserted into a first blow molding machine shown in FIG. 3. The preform 104 was blow-molded in a blow mold 108 having a temperature of 110° C. using a stretching bar 109 and air (blow air injecting portion 110) under the conditions below to obtain a blown bottle 205. The temperature of the preform 104 was 155° C., the air pressure was 0.3 MPa, and the speed of the stretching bar 109 was 700 mm/s. Next, the resultant blown bottle 205 was inserted into a cylindrical die 201 made of nickel and manufactured by electroforming of a second blow molding machine shown in FIG. 4 to mount an outer die 203 on the blown bottle 205. An air pressure of 0.01 MPa was applied inside the blown bottle 205. The blown bottle 205 was transferred onto the inner surface of the die 201 by adjusting the air so that the air did not leak out, while the die 201 was rotated and uniformly heated at 190° C. for 60 seconds with a heater 202. The die 201 was then cooled to room temperature using air and the pressure applied inside the bottle was removed. Thus, a blown bottle whose size was improved by annealing was obtained. By cutting off both ends of the blown bottle, an electrophotographic seamless belt was produced. The thickness of the resultant electrophotographic seamless belt was 80 micrometers. The evaluations (1) to (6) described above were performed on the electrophotographic seamless belt.

Examples 2 to 9

Electrophotographic seamless belts were obtained in the same manner as in Example 1, except that the mixing ratio of the thermoplastic resin composition was changed to those shown in Table 5.

Table 6 shows the results of the evaluations (1) to (6) performed on the electrophotographic seamless belts according to Examples 1 to 9.

TABLE 5

| Constituent | Examples | | | | | | | | |
|---|---|---|---|---|---|---|---|---|---|
| materials | 1 | 2 | 3 | 4 | 5 | 6 | 7 | 8 | 9 |
| PE 1 | 80 | 81 | 77 | 75 | 80 | 80 | — | 80 | 69 |
| PE 2 | — | — | — | — | — | — | 80 | | |
| PEEA 1 | 15 | 12 | 10 | 5 | — | — | 15 | 17 | 28 |
| PEEA 2 | — | — | — | — | 15 | — | — | — | — |
| PEA | — | — | — | — | — | 15 | — | — | — |
| Core-shell particles 1 | 3 | 5 | 10 | 18 | 3 | 3 | 3 | 3 | 3 |
| Core-shell particles 2 | — | — | — | — | — | — | — | — | — |
| Core-shell particles 3 | — | — | — | — | — | — | — | — | — |
| Additive 1 | 2 | 2 | 3 | 2 | 2 | 2 | 2 | — | — |
| Additive 2 | — | — | — | — | — | — | — | — | — |
| Additive 3 | — | — | — | — | — | — | — | — | — |

(In Table 5, the unit is “part by mass”.)

TABLE 6

| Example | Evaluation (1) (Ω · cm) | (2) | (3) | (4) | (5) Initial stage (%) | (5) After durability test (%) | (6) |
|---|---|---|---|---|---|---|---|
| 1 | $2.0 \times 10^{11}$ | A | A | A | 92 | 91 | A |
| 2 | $3.0 \times 10^{11}$ | A | A | A | 92 | 92 | A |
| 3 | $1.0 \times 10^{11}$ | A | A | A | 91 | 91 | A |
| 4 | $5.0 \times 10^{13}$ | A | B | A | 90 | 90 | A |
| 5 | $2.0 \times 10^{11}$ | A | A | A | 91 | 91 | A |
| 6 | $5.0 \times 10^{11}$ | A | A | A | 92 | 90 | A |
| 7 | $2.0 \times 10^{11}$ | A | A | A | 91 | 90 | A |
| 8 | $7.0 \times 10^{11}$ | A | A | A | 92 | 91 | A |
| 9 | $7.0 \times 10^{10}$ | A | B | A | 90 | 88 | A |

Comparative Examples 1 to 10

Electrophotographic seamless belts were obtained in the same manner as in Example 1, except that the mixing ratio of the thermoplastic resin composition was changed to those shown in Table 7. Table 8 shows the results of the evaluations performed on these electrophotographic seamless belts.

TABLE 7

| Constituent | Comparative Example | | | | | | | | | |
|---|---|---|---|---|---|---|---|---|---|---|
| materials | 1 | 2 | 3 | 4 | 5 | 6 | 7 | 8 | 9 | 10 |
| PE 1 | 83 | 80 | 81 | — | — | 80 | 81 | 80 | 80 | 78 |
| PE 2 | — | — | — | 80 | 81 | — | — | — | — | — |
| PEEA 1 | 15 | 15 | 12 | 15 | 12 | 15 | 12 | 15 | 15 | 12 |
| Core-shell particles 2 | — | 3 | 5 | 3 | 5 | — | — | — | 3 | 5 |
| Core-shell particles 3 | — | — | — | — | — | 3 | 5 | — | — | — |
| Additive 1 | 2 | 2 | 2 | 2 | 2 | 2 | 2 | — | — | — |
| Additive 2 | — | — | — | — | — | — | — | 2.5 | 1 | 2.5 |
| Additive 3 | — | — | — | — | — | — | — | 2.5 | 1 | 2.5 |

(In Table 7, the unit is “part by mass”.)

TABLE 8

| Comparative Example | Evaluation (1) | (2) | (3) | (4) | (5) Initial stage (%) | (5) After durability test (%) | (6) |
|---|---|---|---|---|---|---|---|
| 1 | $9.0 \times 10^{10}$ | A | B | C | 85 | 85 | B |
| 2 | $1.0 \times 10^{11}$ | A | C | C | 85 | 84 | B |

TABLE 8-continued

| Comparative Example | Evaluation (1) | (2) | (3) | (4) | (5) Initial stage (%) | (5) After durability test (%) | (6) |
|---|---|---|---|---|---|---|---|
| 3 | $3.0 \times 10^{11}$ | A | C | C | 83 | 81 | C |
| 4 | $3.0 \times 10^{11}$ | A | C | C | 82 | 82 | C |
| 5 | $4.0 \times 10^{11}$ | A | C | C | 84 | 82 | C |
| 6 | $1.0 \times 10^{11}$ | A | C | C | 85 | 80 | B |
| 7 | $2.0 \times 10^{11}$ | A | B | B | 86 | 79 | C |
| 8 | $2.0 \times 10^{11}$ | A | C | C | 85 | 80 | C |
| 9 | $3.0 \times 10^{11}$ | A | B | C | 85 | 84 | B |
| 10 | $4.0 \times 10^{11}$ | B | C | C | 83 | 81 | C |

Examples 10 to 12 and Comparative Examples 11 to 13

Electrophotographic seamless belts were obtained in the same manner as in Example 1, except that the mixing ratio of the thermoplastic resin composition was changed to those shown in Table 9. Table 10 shows the results of the evaluations performed on these electrophotographic seamless belts. In addition to the evaluations (1) to (6) described above, an evaluation (7) was performed on the electrophotographic seamless belts according to Examples 10 to 12 and Comparative Examples 11 to 13.

(7) Evaluation of Quality of 10000th Image

Each of the electrophotographic seamless belts according to Examples and Comparative Examples was installed in a drum cartridge of a full-color electrophotographic apparatus (product name: LBP-5200 manufactured by CANON KABUSHIKI KAISHA) as an intermediate transfer belt. A purple solid image was then formed on a transfer medium by superimposing cyan toner on magenta toner. The same paper as that used in the evaluation (6) was used as the transfer medium. The transfer medium used was paper that had an arithmetical mean roughness (Ra) of 4 and a ten-point mean roughness (Rzjis) of 15 and that was left in an environment of 23° C. and 45% RH for one day. For the image formed on the 10000th transfer medium, the presence or absence of unevenness was observed through visual inspection and the evaluation was performed in accordance with the criteria below.

Evaluation Criteria

A: Density unevenness cannot be seen.

B: Density unevenness is slightly seen over the entire image.

C: Density unevenness is clearly seen over the entire image.

TABLE 9

| Constituent materials | Example 10 | Example 11 | Example 12 | Comparative Example 11 | Comparative Example 12 | Comparative Example 13 |
|---|---|---|---|---|---|---|
| PE 1 | 79 | 78 | 79 | 82 | 81 | 82 |
| PEEA 1 | 15 | 15 | 15 | 15 | 15 | 15 |
| Core-shell particles 1 | 3 | 3 | 3 | — | — | — |

TABLE 9-continued

| Constituent materials | Example 10 | Example 11 | Example 12 | Comparative Example 11 | Comparative Example 12 | Comparative Example 13 |
|---|---|---|---|---|---|---|
| Additive 1 | 2 | 2 | 2 | 2 | 2 | 2 |
| Additive 4 | 1 | 2 | — | 1 | 2 | — |
| Additive 5 | — | — | 1 | — | — | 1 |

(In Table 9, the unit is "part by mass".)

TABLE 10

| | Evaluation (1) | (2) | (3) | (4) | (5) Initial stage (%) | (5) After durability test (%) | (6) | (7) |
|---|---|---|---|---|---|---|---|---|
| Ex. 10 | $9.0 \times 10^{10}$ | A | A | A | 95 | 93 | A | A |
| Ex. 11 | $1.0 \times 10^{11}$ | A | A | A | 95 | 94 | A | A |
| Ex. 12 | $3.0 \times 10^{11}$ | A | A | A | 94 | 94 | A | A |
| C.E. 11 | $3.0 \times 10^{11}$ | A | B | C | 90 | 81 | A | C |
| C.E. 12 | $4.0 \times 10^{11}$ | A | C | C | 92 | 79 | A | C |
| C.E. 13 | $1.0 \times 10^{11}$ | A | B | C | 91 | 80 | A | C |

Ex.: Example
C.E.: Comparative Example

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-215566, filed Sep. 17, 2009, and No. 2010-158132, filed Jul. 12, 2010, which are hereby incorporated by reference herein in their entirety.

The invention claimed is:

1. An electrophotographic belt comprising:

a thermoplastic resin composition obtained by melt-kneading a thermoplastic polyester resin, at least one selected from polyether ester amide and polyether amide, and a particle having a core-shell structure, wherein the particle having a core-shell structure is a particle consisting of a core comprising a silicone resin, and a shell comprising an acrylic resin, and wherein the core of the particle having the core-shell structure is partly exposed.

2. The electrophotographic belt according to claim 1, wherein the thermoplastic polyester resin is at least one selected from polyalkylene terephthalate and polyalkylene naphthalate.

3. The electrophotographic belt according to claim 2, wherein the polyalkylene terephthalate is polyethylene terephthalate.

4. The electrophotographic belt according to claim 2 wherein the polyalkylene naphthalate is polyethylene naphthalate.

5. An electrophotographic apparatus comprising the electrophotographic belt according to claim 1 as an intermediate transfer belt.

* * * * *